United States Patent
Fujino

(10) Patent No.: US 11,053,089 B2
(45) Date of Patent: Jul. 6, 2021

(54) PRINTING APPARATUS, CONTROL METHOD THEREOF AND STORAGE MEDIUM

(71) Applicant: CANON KABUSHIKI KAISHA, Tokyo (JP)

(72) Inventor: Kazuhisa Fujino, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/522,850

(22) Filed: Jul. 26, 2019

(65) Prior Publication Data

US 2020/0039773 A1 Feb. 6, 2020

(30) Foreign Application Priority Data

Aug. 1, 2018 (JP) .............................. JP2018-144920

(51) Int. Cl.

| B41J 11/42 | (2006.01) |
| B65H 7/06 | (2006.01) |
| B41J 13/10 | (2006.01) |
| B41J 11/00 | (2006.01) |
| H04N 1/00 | (2006.01) |
| B41J 2/045 | (2006.01) |
| B41J 3/407 | (2006.01) |

(52) U.S. Cl.
CPC ............ *B65H 7/06* (2013.01); *B41J 2/04556* (2013.01); *B41J 11/0095* (2013.01); *B41J 13/103* (2013.01); *H04N 1/00076* (2013.01); *B41J 3/4071* (2013.01)

(58) Field of Classification Search
CPC ................. B65H 7/06; B65H 2511/52; B65H 2511/515; B65H 2511/20; B65H 2511/24; B65H 2405/31; B65H 2405/12; B41J 13/103; B41J 11/0095; B41J 2/04556; B41J 3/4071; B41J 3/46; H04N 1/00076
See application file for complete search history.

(56) References Cited

U.S. PATENT DOCUMENTS

| 6,871,946 B2 | 3/2005 | Yanagi et al. |
| 10,343,426 B2 | 7/2019 | Fujino |

(Continued)

FOREIGN PATENT DOCUMENTS

| JP | 2004-042372 A | 2/2004 |
| JP | 2005-035692 A | 2/2005 |

OTHER PUBLICATIONS

Machine translation of JP 2005-035692, published on Feb. 2005 (Year: 2005).*

*Primary Examiner* — Huan H Tran
(74) *Attorney, Agent, or Firm* — Venable LLP

(57) ABSTRACT

A printing apparatus includes a conveyance unit configured to convey a tray on which a printing medium is placed, a printing unit configured to perform printing on a print surface of a printing medium on the tray based on a print job, and a first detection unit configured to detect a relative position relationship between the tray and a printing medium placed on the tray. In addition, a control unit is configured to control the printing unit not to perform printing in a case where the first detection unit detects that the printing medium is not placed at an appropriate position, and a selecting unit is configured to select whether to continue printing irrespective of results of the detection by the first detection unit.

16 Claims, 10 Drawing Sheets

(56) References Cited

U.S. PATENT DOCUMENTS

| | | | | |
|---|---|---|---|---|
| 2004/0041880 A1* | 3/2004 | Ikeda | ............... | B41J 25/308 347/37 |
| 2004/0051917 A1* | 3/2004 | Kawazoe | ............... | B41J 11/008 358/498 |
| 2004/0061757 A1* | 4/2004 | Yanagi | ............... | B41J 3/4071 347/101 |
| 2005/0041054 A1* | 2/2005 | Kawaguchi | ............... | B41J 3/4071 347/19 |
| 2006/0080687 A1* | 4/2006 | Miyashita | ............... | B41J 3/4071 720/603 |
| 2017/0346975 A1* | 11/2017 | Sakai | ............... | H04N 1/00708 |

* cited by examiner

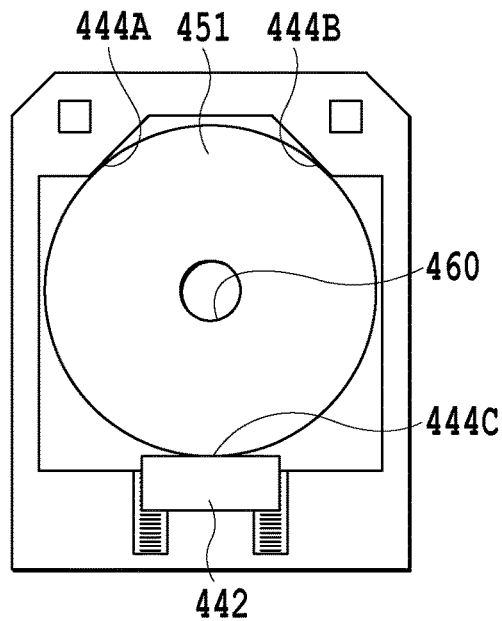
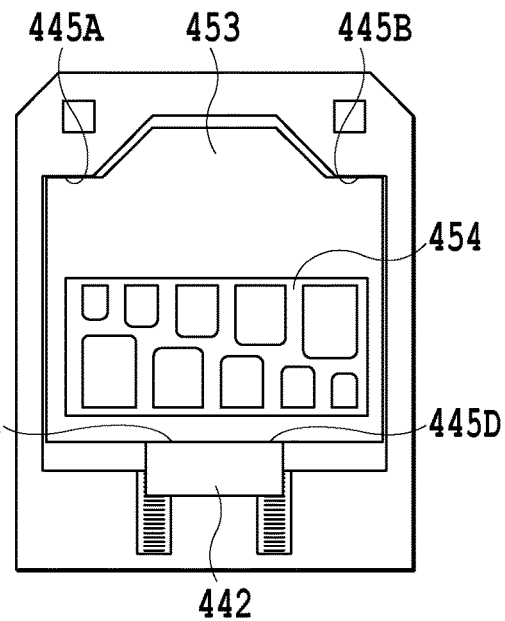
FIG.5A  FIG.5B
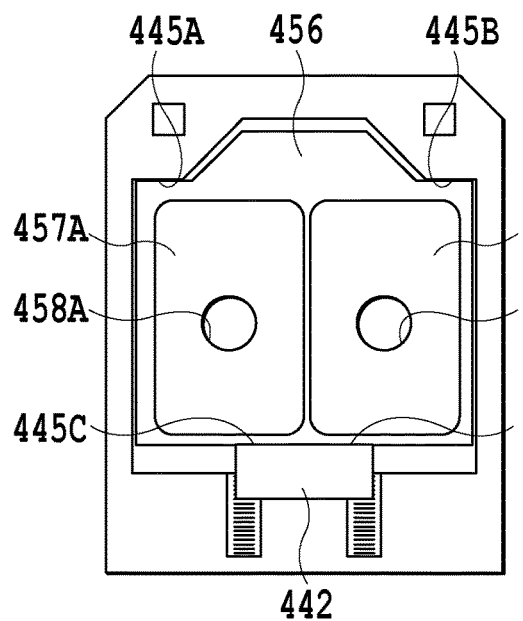
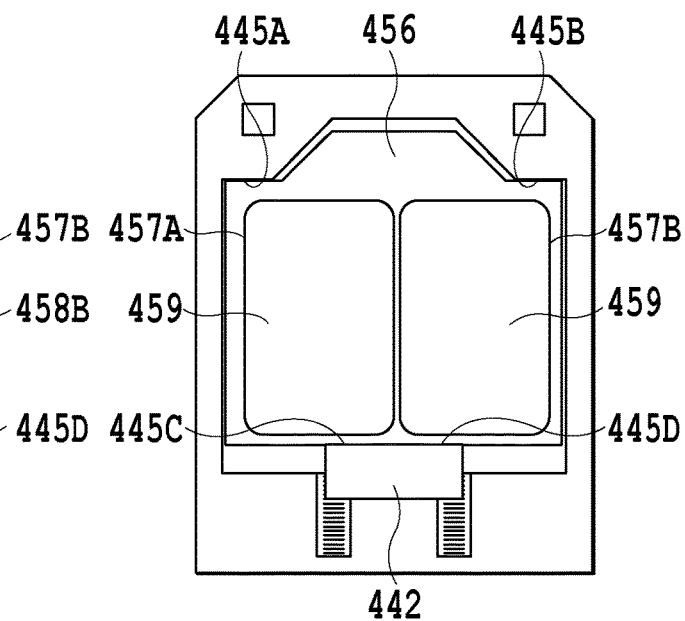
FIG.5C  FIG.5D

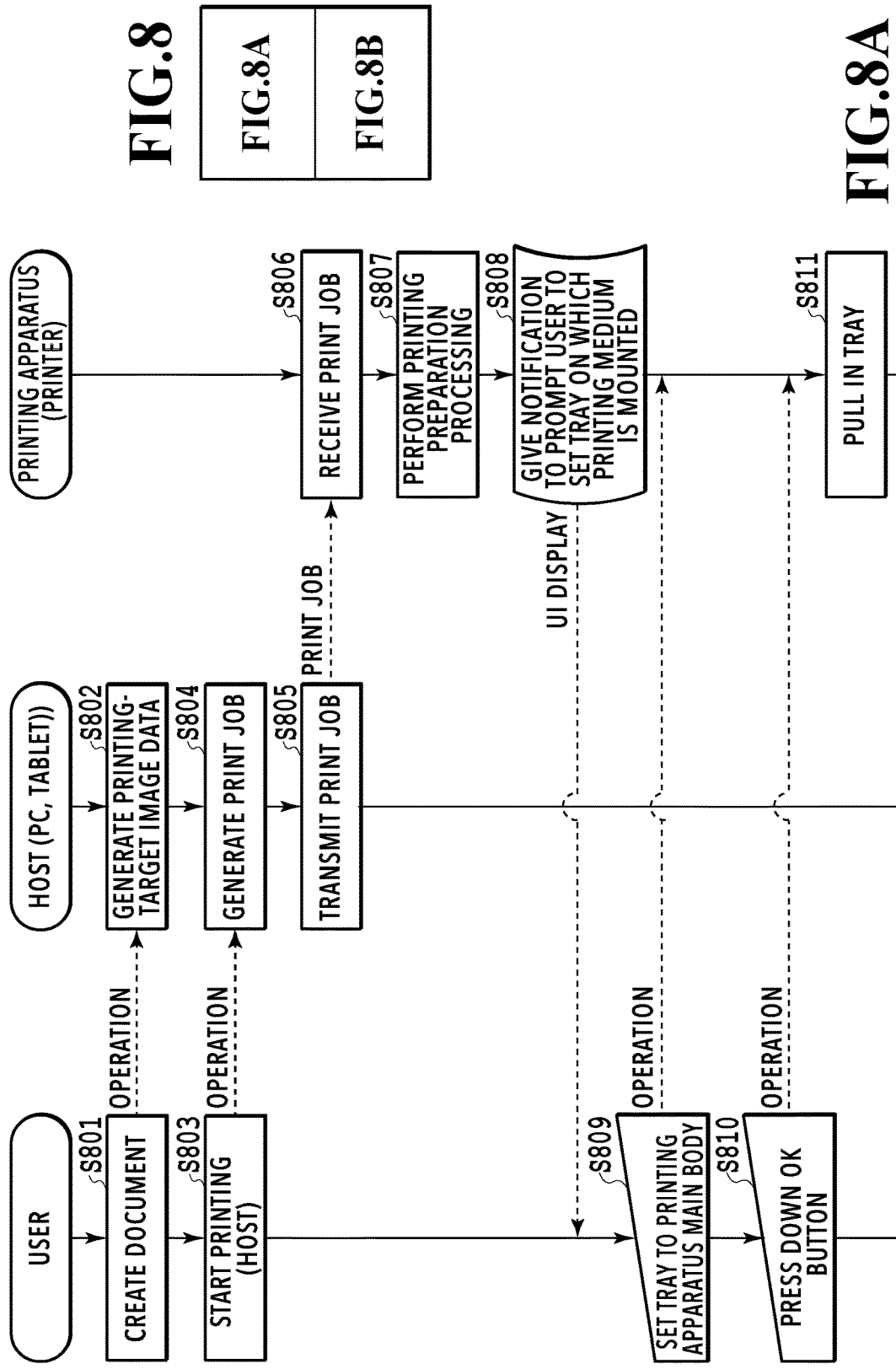

PRINTING APPARATUS, CONTROL METHOD THEREOF AND STORAGE MEDIUM

BACKGROUND OF THE INVENTION

Field of the Invention

The present invention relates to a printing apparatus, a control method thereof, and a storage medium.

Description of the Related Art

In a case where printing is performed on a printing medium, such as a disc, whose rigidity is high unlike a common sheet, it is known that printing is performed by using a mechanism that conveys a tray on which a printing medium is placed, in place of a sheet conveyance mechanism. In printing by the tray conveyance such as this, there is a case where the printing position shifts due to variations in the accuracy of parts and a shift at the time of setting the tray to the printing apparatus. Further, in a case where printing is started in a state where no printing medium is placed on the tray, the inside of the printing apparatus and the tray are stained.

For these problems, Japanese Patent Laid-Open No. 2004-42372 has made it possible to perform printing at the accurate position on a printing medium by attaching a reflection plate whose reflectance is largely different from that of the tray and deriving the position at which the printing medium is placed by taking the position of the reflection plate as a reference. Further, the presence/absence of the printing medium (that is, whether or not the printing medium is placed) is determined by providing the reflection plate also at the position that is covered by the printing medium placed on the tray and by detecting light from the reflection plate before starting printing processing.

SUMMARY OF THE INVENTION

However, Japanese Patent Laid-Open No. 2004-42372 does not suppose that the relative position relationship between the tray and the printing medium placed on the tray shifts from that intended by a designer. Because of this, for example, in such a case where the tray is set correctly at the printing position but the printing medium is not placed correctly on the tray, printing is performed at a position outside the printing medium, and as a result of this, there is a possibility that the inside of the printing apparatus and the tray are stained. Further, in such a case where the printing medium on the tray is about to come off and the reflection plate is hidden by the printing medium, as a result of continuing printing processing in the state where the printing medium is about to come off and the printing medium coming off during printing, there is a possibility that the inside of the printing apparatus and the tray are stained.

Consequently, in view of the above-described problems, an object of the present invention is to prevent printing processing from being performed in a case where a printing medium is not placed correctly on a tray because of an erroneous operation of a user, or the like.

The present invention is a printing apparatus including: a conveyance unit configured to convey a tray on which a printing medium is placed; a printing unit configured to perform printing on a print surface of a printing medium on the tray based on a print job; and a first detection unit configured to detect a relative position relationship between the tray and a printing medium placed on the tray; and the printing apparatus has a first notification unit configured to give a notification of an error indicating that a placing position of the printing medium is not an appropriate position based on detection results by the first detection unit.

Further features of the present invention will become apparent from the following description of exemplary embodiments with reference to the attached drawings.

BRIEF DESCRIPTION OF THE DRAWINGS

FIG. 5A to FIG. 5D are each a diagram showing a printing medium placed on the tray in the first embodiment;

FIG. 6A and FIG. 6B are flowcharts of a printing operation in the first embodiment;

DESCRIPTION OF THE EMBODIMENTS

In the following, preferred embodiments of the present invention are explained in detail with reference to the drawings. Aspects explained below are not intended to limit the present invention according to the scope of the claims and all combinations of features explained below are not necessarily indispensable to solve the problems of the present invention.

First Embodiment

<About Schematic Configuration of Printing Apparatus>

Figure 1:
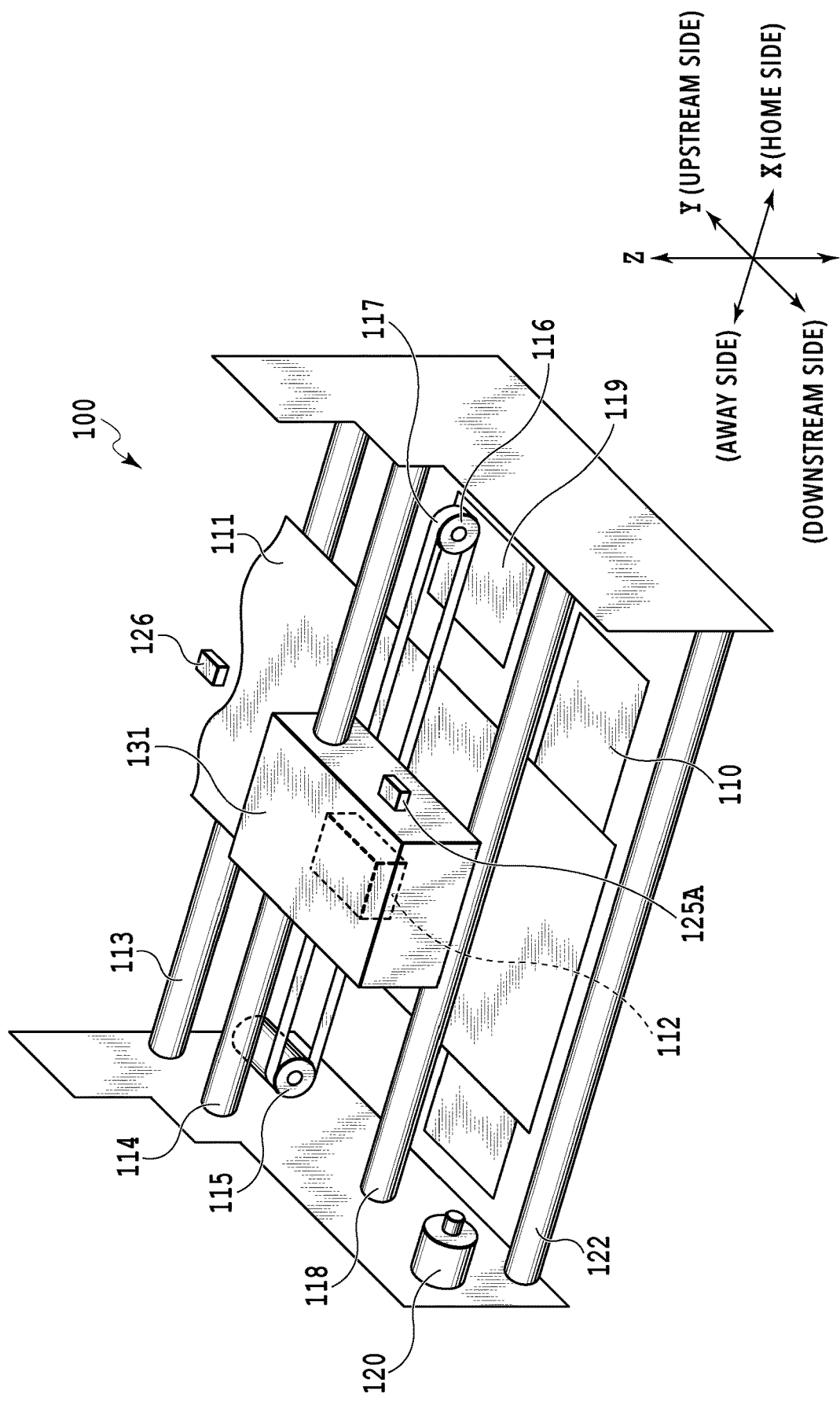
FIG. 1 is a perspective diagram of a printing apparatus in a first embodiment.

In the following, a schematic configuration of a printing apparatus in the present embodiment is explained by using FIG. 1. FIG. 1 is a perspective diagram showing a schematic configuration of a printing apparatus in the present embodiment. As shown in FIG. 1, a printing apparatus 100 has a carriage 131 mounting a print head 112 at a position in opposition to a printing medium 111. In FIG. 1, for simplification, a case is shown where the carriage 131 mounts the one print head 112, but the number of print heads mounted on the carriage 131 may be two or more.

The carriage 131 is guided and supported rotatably and slidably by a guide axis 114, which is a guide member. At one end of the movement range of the carriage 131, a pulley-attached carriage motor 115 is arranged and at the other end, an idle pulley 116 is arranged. A timing belt 117 is put on these units and the carriage 131 and the timing belt 117 are linked.

In order to prevent the carriage 131 from rotating with the guide axis 114 as a center, a support member 118 extending in parallel to the guide axis 114 is installed and the carriage 131 is supported slidably by the support member 118. Further, a maintenance mechanism 119 for performing maintenance of the print head 112 is provided in a non-printing area. The maintenance mechanism 119 includes, for example, a cap (not shown schematically) for sealing an opening of the nozzle of the print head 112 at the time of non-printing, a wiper (not shown schematically) for wiping off foreign matter and excessive ink attached to the nozzle surface, and the like.

With the configuration such as this, the carriage 131 reciprocates along the guide axis 114 (that is, along the direction of an arrow X in FIG. 1 (main scanning direction)) between one end and the other end in the axial direction of the guide axis 114. Hereinafter, the side nearer to the maintenance mechanism 119 in the main scanning direction is called a HOME side and the side distant therefrom is called an AWAY side.

By driving a conveyance motor 120, the first conveyance roller 113 and a second conveyance roller 122 rotate. Due to this, the printing medium 111 is conveyed in the direction (the direction of an arrow Y in FIG. 1: conveyance direction) intersecting with the movement direction of the carriage 131 (the direction of the arrow X in FIG. 1: main scanning direction). In the printing apparatus 100, an edge sensor 126 that detects the printing medium 111 within the conveyance path is provided. The printing medium 111 is conveyed on a platen 110 along the Y direction from the upstream side toward the downstream side. The edge sensor 126 is arranged upstream of the carriage 131 in the Y direction.

To the carriage 131, an optical sensor 125A is attached. Further, it is assumed that it is possible for the carriage 131 to move in the direction (Z-direction) perpendicular to a plane formed by the main scanning direction (X-direction) and the conveyance direction (Y-direction). The above is the contents of the schematic configuration of the printing apparatus in the present embodiment.

<About Hardware Configuration of Printing Apparatus>

Figure 2:
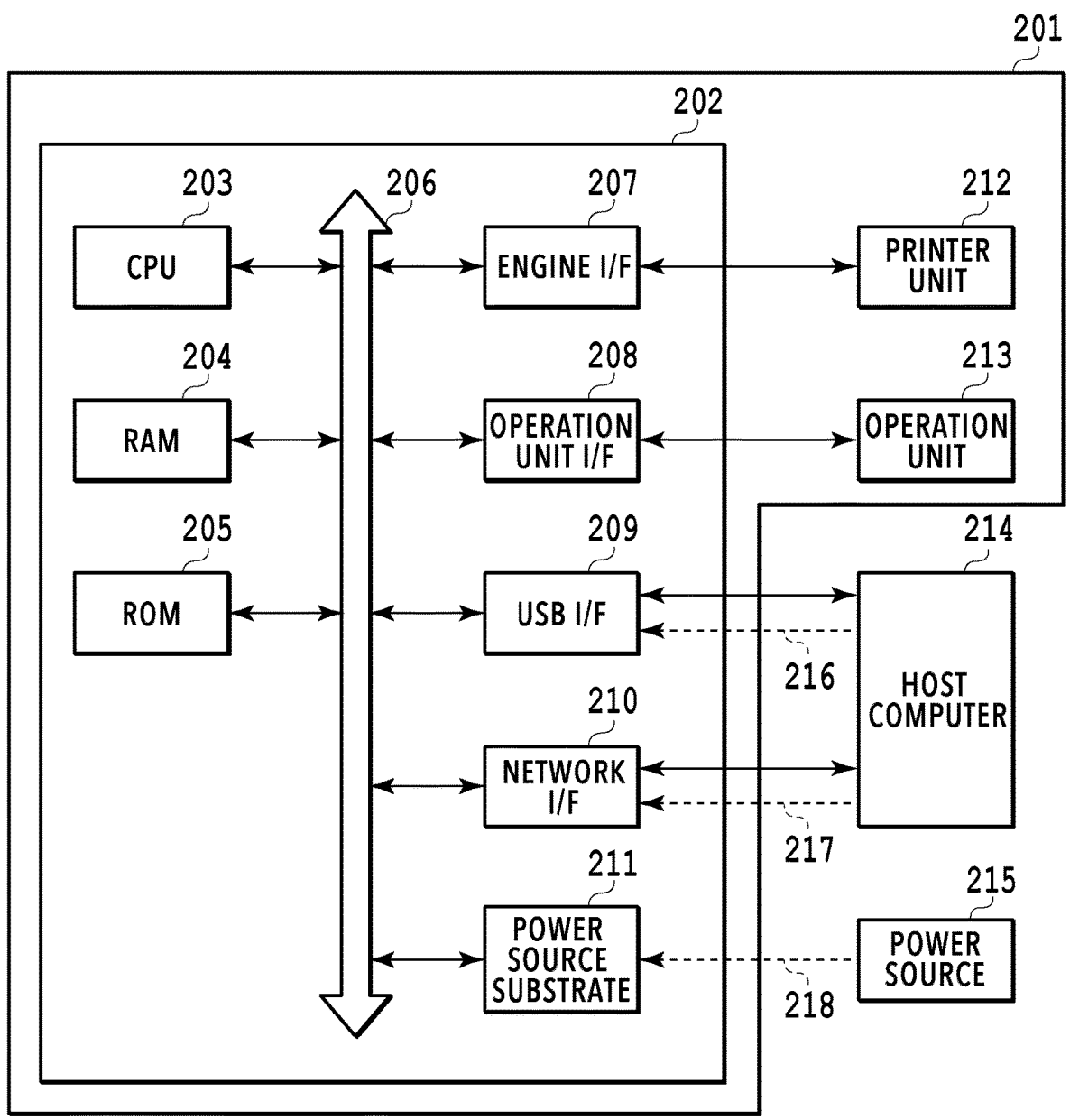
FIG. 2 is a block diagram showing a hardware configuration of the printing apparatus in the first embodiment.

In the following, the hardware configuration of the printing apparatus in the present embodiment is explained by using FIG. 2. FIG. 2 is a block diagram showing the hardware configuration of the printing apparatus in the present embodiment. A printing apparatus 201 has a control unit 202. Components included in the control unit 202 are connected to one another via a bus 206 and it is possible to perform transmission and reception of data between the components.

A CPU 203 located in the control unit 202 loads control programs stored in a ROM 205 onto a RAM 204 and performs various kinds of control, such as control at the time of turning on the power source and printing control, by reading the loaded control programs as needed.

The RAM 204 is a main storage memory of the CPU 203 and used as a work area and a temporary storage area onto which various programs stored in the ROM 205 are loaded. The ROM 205 stores image data, various programs, and various kinds of setting information. In the present embodiment, a case is described where the printing apparatus 201 has the ROM 205, which is supposed to be a flash storage or the like, but it may also be possible for the printing apparatus to have an auxiliary storage device, such as a hard disk, in addition to the ROM or in place of the ROM.

In the following, it is assumed that the one CPU 203 performs each piece of processing shown in flowcharts, to be described later, by using one memory (RAM 204) in the printing apparatus 201, but another aspect may be accepted. For example, it is also possible to perform each piece of processing shown in flowcharts, to be described later, by causing a plurality of CPUs and a plurality of RAMs, ROMs, and storages to cooperate with one another. Further, it may also be possible to perform part of the processing by using a hardware circuit.

An engine interface (hereinafter, interface is abbreviated to I/F) 207 connects a printer unit 212 and the control unit 202. Image data to be printed in the printer unit 212 is transferred from the control unit 202 to the printer unit 212 via the engine I/F 207. The printer unit 212 prints an image on the printing medium 111, such as a sheet, based on the transferred image data.

An operation unit I/F 208 connects an operation unit 213 and the control unit 202. The operation unit 213 is provided with a liquid crystal display unit having a touch panel function, operation keys, and the like, and the operation unit 213 functions as a reception unit configured to receive user instructions. The printing apparatus 201 and a host computer 214 are connected via a USB cable 216 and a USB I/F 209 controls communication between the printing apparatus 201 and the host computer 214 via the USB cable 216. Further, the printing apparatus 201 and the host computer 214 are connected via a network cable 217 and a network I/F 210 controls communication between the printing apparatus 201 and the host computer 214 via the network cable 217. A power source substrate 211 changes the voltage of power supplied from a power source 215 via a power source cable 218 and supplies the power to the printing apparatus 201. Further, the power source substrate 211 may include a storage battery capable of storing power. The above is the contents of the hardware configuration in the present embodiment.

<About Software Configuration of Printing Apparatus>

Figure 3:
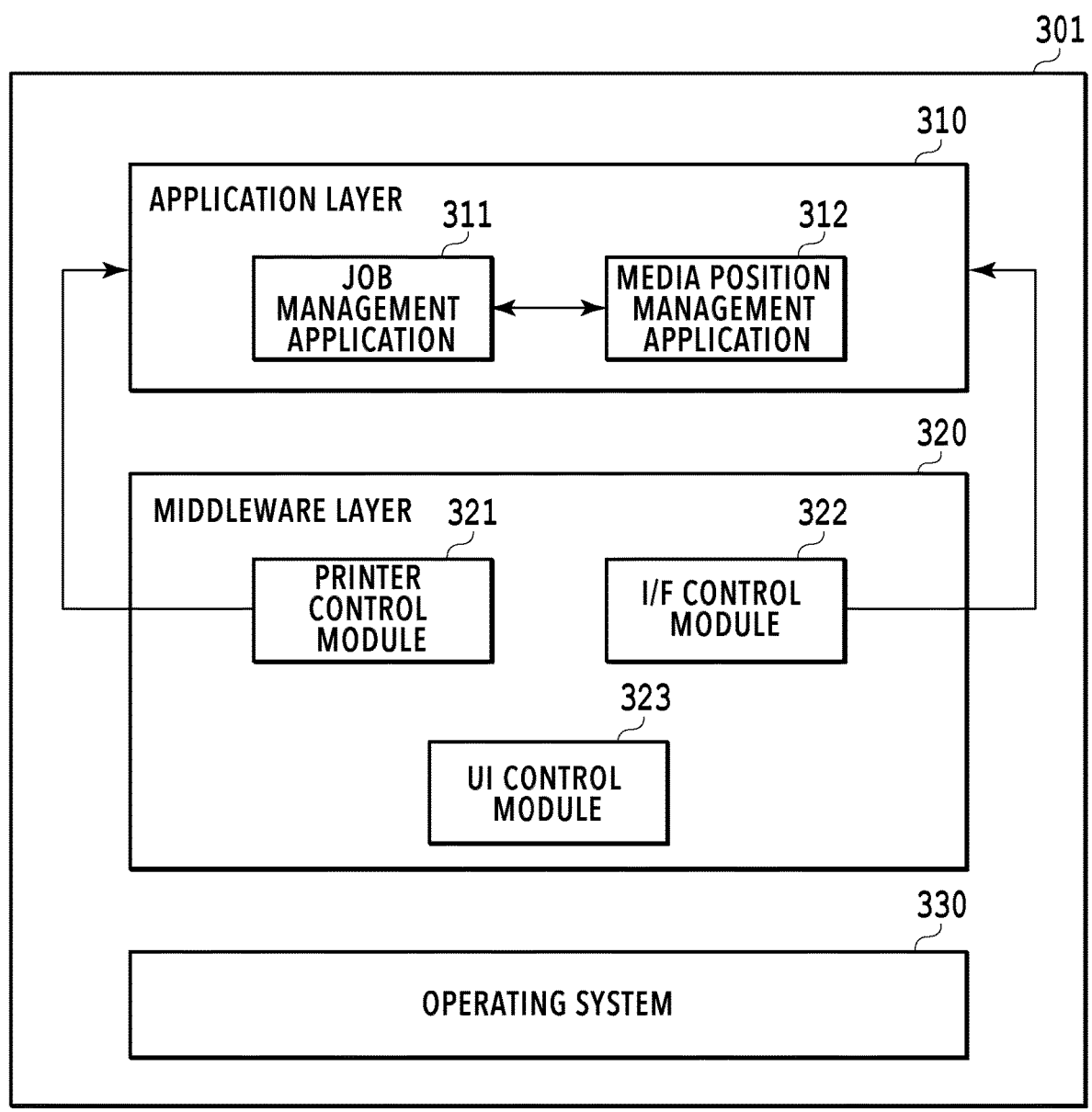
FIG. 3 is a block diagram showing a software configuration of the printing apparatus in the first embodiment.

In the following, the software configuration of the printing apparatus in the present embodiment is explained by using FIG. 3. FIG. 3 is a block diagram showing the software configuration of the printing apparatus in the present embodiment, in detail, the software configuration of control programs to be loaded onto the RAM for controlling each hardware module described previously.

As shown in FIG. 3, the control programs possessed by a printing apparatus 301 are roughly divided into three blocks. That is, an application layer 310 for managing applications, a middleware layer 320 for controlling devices via various I/Fs, and an operating system 330 for managing control of the entire printing apparatus 301.

The role of each of the three blocks is explained. The operating system 330 provides fundamental functions necessary at the time of the control unit 202 executing the control programs.

The middleware layer 320 includes a module group that controls I/Fs connecting the control unit, and the printer unit and each physical device. In this example, a configuration is assumed in which a printer control module 321 controls the engine I/F 207, an I/F control module 322 controls the USB I/F 209 and the network I/F 210, and a UI control module 323 controls the operation unit I/F 208.

The application layer 310 includes an application group for implementing each function, such as printing, provided to a user by the printing apparatus 301 by causing the hardware modules described previously to operate via each module configuring the middleware layer 320. For example, in a case where the UI control module 323 detects that a user has performed printing by operating the operation unit 213 via the operation unit I/F 208, the application layer 310 is notified of this.

A job management application 311 is an application for analyzing and managing a print job received from the host computer. By the job management application 311 analyzing a print job, information indicating the size and the like of a printing-target printing medium (referred to as media information) is obtained. The job management application 311 performs the printing operation by controlling the printer unit 212 via the engine I/F 207 by using the printer control module 321.

A media position management application 312 receives media information from the job management application 311 and transmits the received media information to the printer control module 321.

The printer control module 321 controls the printer unit 212 based on the media information and acquires position information by deriving the position on the tray on which the printing medium 111 is placed. In a case where the printing medium 111 is not placed, the media position management application 312 controls the UI control module 323 and prompts a user to place the printing medium 111 again on the tray. On the other hand, in a case where physical position information on the printing medium 111 is acquired, the media position management application 312 transmits information on the relative position relationship between the tray 403 and the printing medium to the job management application 311. Specifically, the information is information indicating the magnitude of a shift (amount of misalignment) between the theoretical position and the actual position of the printing medium 111. The job management application 311 generates print data corrected based on the amount of misalignment, controls the printer unit 212 by using the printer control module 321, and performs the printing operation based on the corrected print data. The above is the contents of the software configuration in the present embodiment.

<About Tray>

Figure 4:
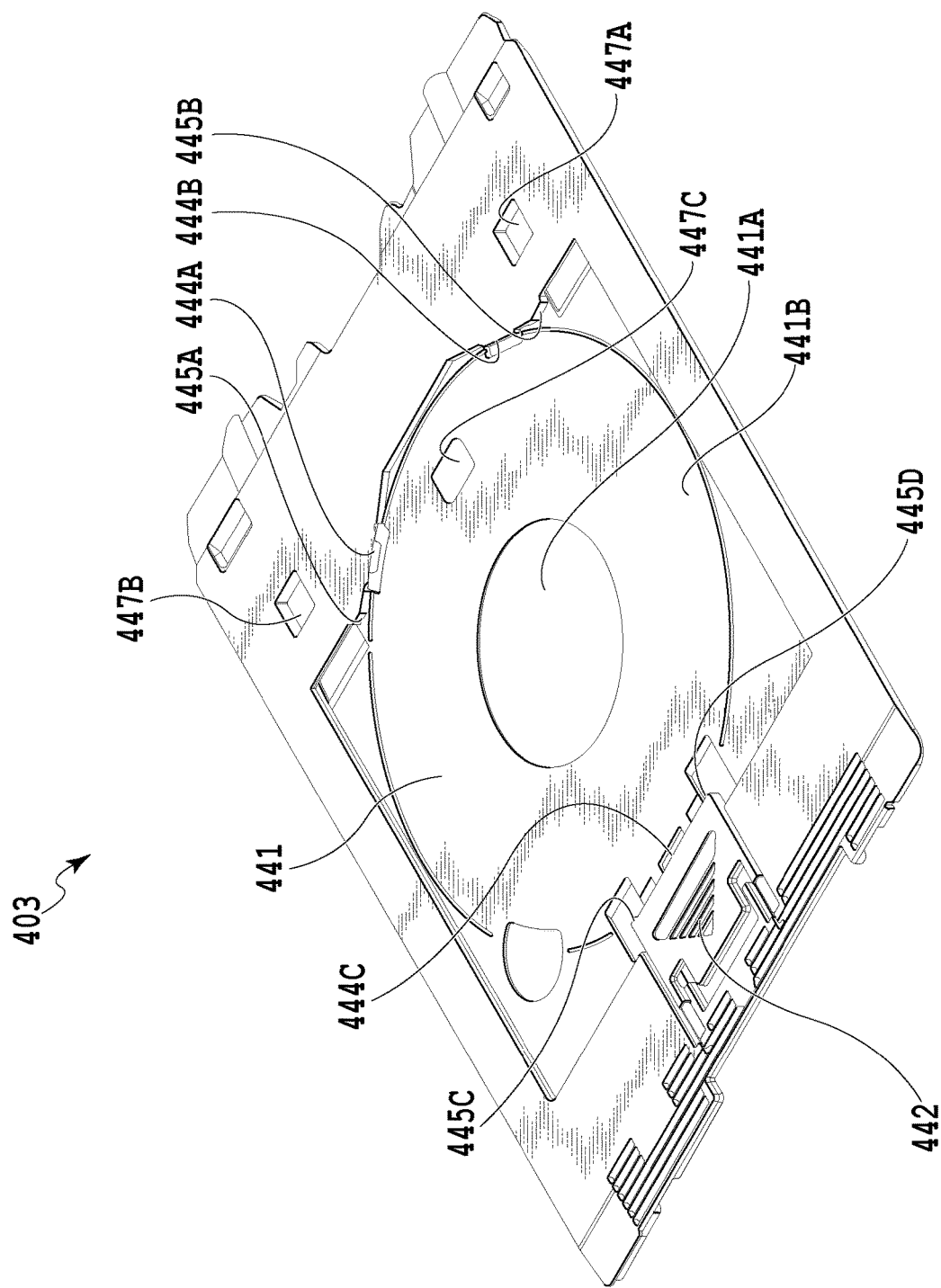
FIG. 4 is a perspective diagram of a tray in the first embodiment.

In the following, the tray in the present embodiment is explained by using FIG. 4 and FIG. 5A to FIG. 5D. FIG. 4 is a perspective diagram of a tray 403 in the present embodiment. It is possible for the tray 403 to selectively place a plurality of kinds of printing medium. As a typical example of the printing medium that can be placed on the tray 403, a circular printing medium, a nail seal mount, a card mount, a plastic card medium, and the like are supposed. FIG. 5A shows an image in which a circular printing medium 451 is placed on the tray 403 and FIG. 5B shows an image in which a nail seal mount 453 is placed on the tray 403. Further, FIG. 5C shows an image in which a single card mount 456 is placed on the tray 403 and FIG. 5D shows an image in which plastic card media 459 (hereinafter, called cards) are set on the card mount 456.

As the circular printing medium 451, a printable disc having a print receiving layer on the surface thereof is supposed. Specifically, mention is made of a CD (Compact Disc), a DVD (Digital Versatile Disc), a BD (Blu-ray (registered trademark) Disc), and the like. Hereinafter, the circular printing medium 451 is called an optical disc. The optical disc 451 is grasped by the tray 403 by coming into contact with abutting portions 444A and 444B provided to the tray 403 and an abutting portion 444C provided to a pressing member 442 in a state where the print surface faces upward.

On the nail seal mount 453, a nail seal group 454 is arranged and the nail seal amount 453 is made of a plastic material in the shape of a plate. In the nail seal group 454, nail seals of different sizes for nail art are arranged and it is possible to perform printing on each nail seal having an ink receiving layer. The nail seal mount 453 is grasped by the tray 403 by coming into contact with abutting portions 445A and 445B provided to the tray 403 and abutting portions 445C and 445D provided to the pressing member 442.

The card mount 456 is a plate-shaped mount having set portions 457A and 457B in a concave shape and it is possible to hold the cards 459 by inserting the cards 459 into the set portions 457A and 457B. The card 459 is, for example, a printable printing medium of a credit card size. The external shape of the card mount 456 is substantially the same as the external shape of the nail seal mount 453. The card mount 456 is grasped by the tray 403 by coming into contact with the abutting portions 445A and 445B provided to the tray 403 and the abutting portions 445C and 445D provided to the pressing member 442.

As described previously, FIG. 5C shows the state where the single card mount 456 is placed on the tray 403 and FIG. 5D shows the state where the cards 459 are set on the card mount 456. The card mount 456 is provided with detection holes 458A and 458B and in the state where the cards 459 are not set on the card mount 456, the detection holes 458A and 458B are not covered and the surface of the tray 403 is exposed. Further, in this example, the configuration is such that the tray 403 is black and the card 459 is white. In a case where a user inserts the tray 403 into the printing apparatus 100, the tray 403 is conveyed and moved so that the position of the optical sensor 125A coincides with the positions of the detection holes 458A and 458B in the sub scanning direction. Then, while moving the carriage 131 so as to cross over the detection holes 458A and 458B in the main scanning direction, the presence/absence of a card is determined by using the optical sensor 125A. Specifically, in a case where the carriage 131 passes over the white card 459, the amount of light received by the optical sensor 125A is large and on the other hand, in a case where the carriage 131 passes over the uncovered (exposed) detection holes 458A and 458B, the amount of light received by the optical sensor 125A is small. Consequently, it is possible to determine whether or not the cards 459 are set on the set portions 457A and 457B based on the magnitude of the amount of received light. The above is the contents relating to the tray in the present embodiment.

<About Printing Operation>

Figure 6:
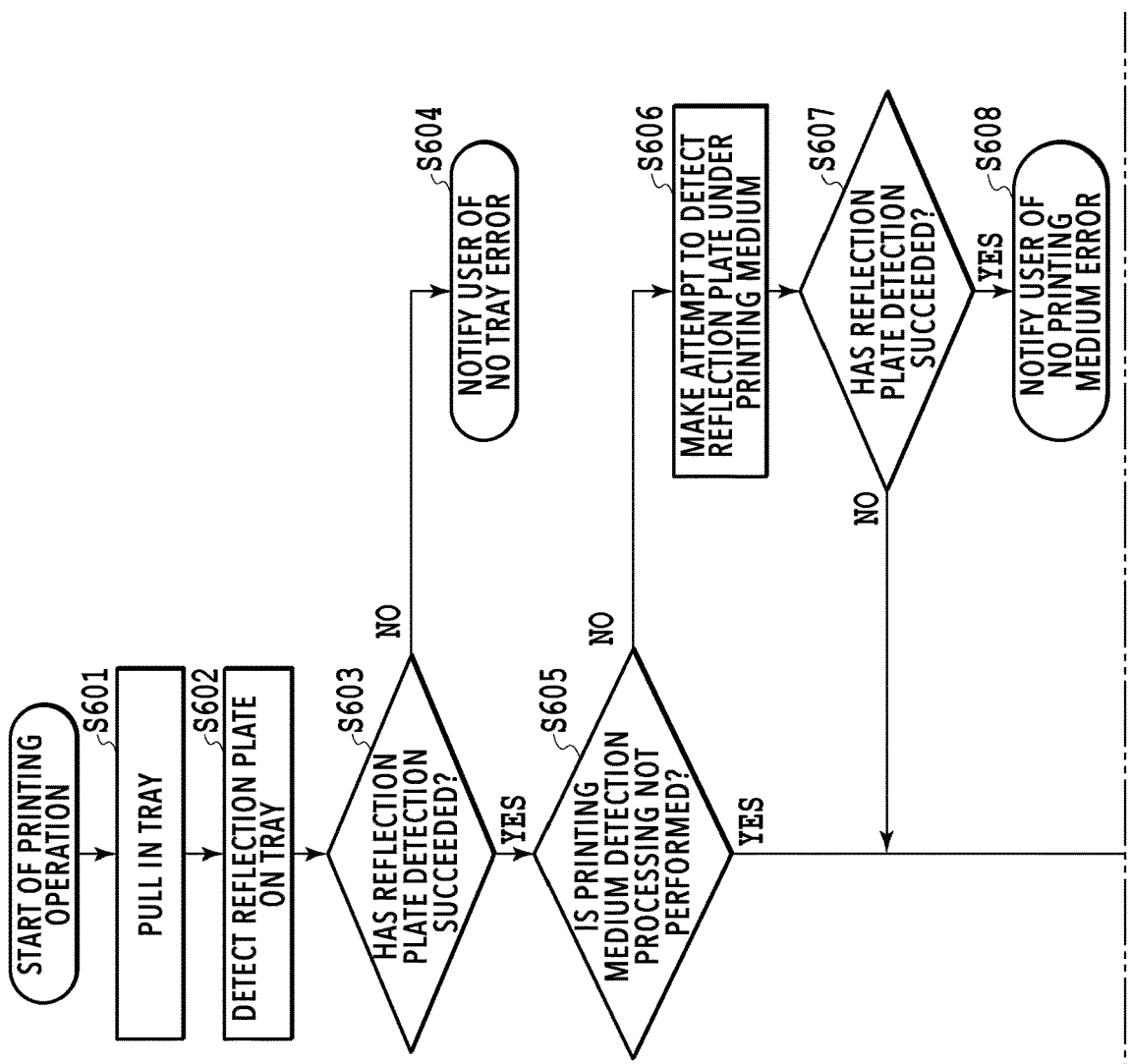
FIG. 6 is a diagram showing the relationship between FIG. 6A and FIG. 6B.
Figure 6:
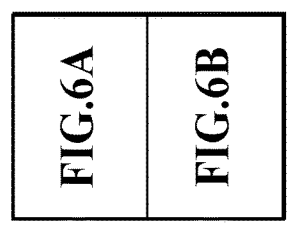
Figure 6B:
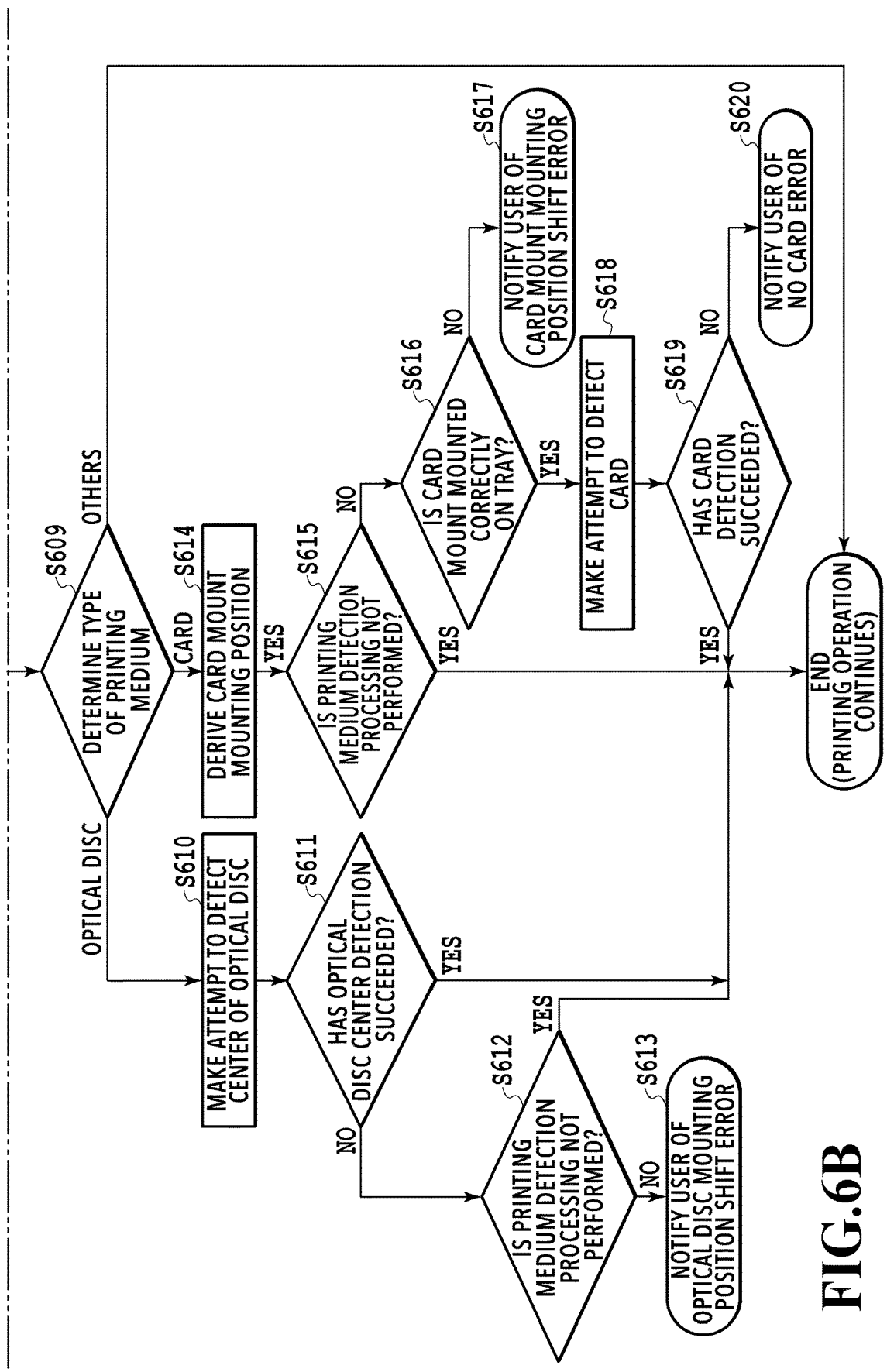

FIG. 6 shows a flow of the printing operation performed for the printing medium 111 placed on the tray 403 by the printing apparatus 100 having received a print job from the host computer 214 via the USB I/F 209 or the network I/F 210. In the present embodiment, it is supposed that the printing apparatus 100 receives a print job from the host computer 214, but it may also be possible for the printing apparatus 100 to single-handedly generate a print job.

At step S601, the printer control module 321 controls the printer unit 211 via the engine I/F 207 and rotates the conveyance motor 120 in the reverse direction (in other words, so that the tray is conveyed from the downstream side to the upstream side). Due to this, the tray 403 is pulled into the printing apparatus 100. In the following, "step S-" is simply abbreviated to "S-".

At S602, the printer control module 321 derives, by detecting a first reflection plate 447A and a second reflection plate 447B provided on the tray 403 by using the optical sensor 125A, position information on the tray, which includes the positions of these reflection plates. Specifically, the printer control module 321 controls the printer unit 212 via the engine I/F 207 and rotates the conveyance motor 120 in the reverse direction. Due to this, the first conveyance roller 113 and the second conveyance roller 122 rotate in the reverse direction, and therefore, the tray 403 is pulled into the printing apparatus 100. After this, the printer control module 321 pulls in the tray 403 until the first reflection plate 447A is located under the optical sensor 125A in the sub scanning direction. Here, it reads "until the first reflection plate 447A is located under the optical sensor 125A", but it may also be possible to read the second reflection plate 447B in place of the first reflection plate 447A. At the time of pulling in the tray 403, it is recommended to move in advance the carriage 131 in the main scanning direction so that the first reflection plate 447A passes under the optical sensor 125A. After the detection of the upstream side end portion of the reflection plate, the tray 403 is further pulled in by rotating the conveyance motor 120 in the reverse direction by a predetermined amount and the downstream side end portion of the reflection plate is detected. After this, while rotating the conveyance motor 120 in the forward direction (in other words, so that the tray is conveyed from the upstream side to the downstream side) by a predetermined amount to discharge the tray 403 out of the apparatus, the upstream side end portion of the reflection plate is detected by using the optical sensor 125A. It is possible to derive the center position in the sub scanning direction of the first reflection plate 447A by finding the middle point between the upstream side end portion and the downstream side end portion that are detected. The left side end portion and the right side end portion in the main scanning direction of the first reflection plate 447A are detected by controlling the conveyance motor 120 so that the optical sensor 125A is located at the center position of the first reflection plate 447A in the sub scanning direction and by using the optical sensor 125A while moving the carriage 131 in the main scanning direction. It is possible to derive the center position in the main scanning direction of the first reflection plate 447A by finding the middle point between the left side end portion and the right side end portion that are detected. The center position of the second reflection plate 447B is derived by also performing the same processing for the second reflection plate 447B. It is possible to derive the inclination of the tray 403 based on the center position of the first reflection plate 447A and the center position of the second reflection plate 447B. It is possible to derive the physical printing-target area based on the inclination of the tray 403 and information indicating the shape of the tray 403 and the shape for each type of printing medium, which is stored in advance in the RAM 204 or the ROM 205.

At S603, the printer control module 321 determines whether the first reflection plate 447A and the second reflection plate 447B are detected as a result of the processing to detect the reflection plate at S602. This step is performed by supposing a case where, for example, the tray 403 is not set within the apparatus and it is not possible to detect these reflection plates by the optical sensor 125A. In a case where determination results at S603 are affirmative, the processing advances to S605 and on the other hand, the determination results are negative, the processing advances to S604.

In a case of NO at S603, at S604, the UI control module 323 controls the operation unit I/F 208 and notifies a user that the tray 403 is not set to the apparatus (no tray error) through the operation unit 213. As the method of giving a notification to a user, it may also be possible to transmit data to the host computer 214 via the USB I/F 209 or the network I/F 210 and to give a notification through the operation unit of the host computer 214.

In a case of YES at S603, at S605, the job management application 311 determines whether not to perform processing performed for determining the presence/absence of a printing medium on the tray (that is, printing medium detection processing). The determination at S603 is performed by referring to information (referred to as execution possible/impossible information) indicating whether or not the printing medium detection processing is performed. It may also be possible to add the information indicating whether or not the printing medium detection processing is performed to a print job or to store in advance information set by a user in the RAM 204 or the ROM 205.

In a case of NO at S605 (that is, in a case where printing medium detection processing is performed), at S606, the printer control module 321 makes an attempt to detect the reflection plate located at the position covered by a printing medium in a case where the printing medium is placed on the tray. In detail, the printer control module 321 moves the tray 403 so that the optical sensor 125A is located at the center position of the third reflection plate 447C in the sub scanning direction by rotating the conveyance motor 120 in the forward direction (or in the reverse direction) in order to detect the third reflection plate 447C (FIG. 4) on the tray 403. Next, the printer control module 321 makes an attempt to detect the left and right end portions in the main scanning direction of the third reflection plate 447C by using the optical sensor 125A while moving the carriage 131 in the main scanning direction. In a case where a printing medium, such as the optical disc 451, is not placed on the tray 403 and the third reflection plate 447C is not covered, the amount of light received by the optical sensor 125A is small in the black portion of the tray 403, but the amount of light received by the optical sensor 125A in the portion of the third reflection plate 447C is large. In contrast to this, in a case where a printing medium, such as the optical disc 451, is placed on the tray 403 and the third reflection plate 447C is covered, by the light reflected from the white portion of the printing medium, the amount of light received by the optical sensor 125A is a large constant value. Because of this, it is possible to determine whether or not a printing medium is placed on the tray 403 based on the amount of light received by the optical sensor 125A. Here, the aspect in which the black tray 403 and the reflection plate are used is shown, but the present embodiment is not limited to this and any aspect may be accepted in which the amount of reflected light that changes depending on the presence/absence of a printing medium is made use of. Alternatively, it may also be possible to detect the presence/absence of a printing medium by using a distance sensor after providing concave and convex portions on the tray 403, without using the optical sensor 125A. In this case, the concave portion is provided at the position that is covered in a case where a printing medium is placed.

At S607, the media position management application 312 determines whether the third reflection plate 447C is detected as a result of the reflection plate detection processing at S606. In a case where determination results at S607 are affirmative, the processing advances to S608 and on the other hand, in a case where the determination results are negative, the processing advances to S609.

In a case of YES at S607, it is possible to estimate that no printing medium is placed on the tray 403. Consequently, in this case, at S608, the UI control module 323 controls the operation unit I/F 208 and notifies a user that no printing medium is placed on the tray 403 (no printing medium error) through the operation unit 213. As the method of giving a notification to a user, it may also be possible to transmit data to the host computer 214 via the USB I/F 209 or the network I/F 210 and to give a notification through the operation unit of the host computer 214.

In a case of YES at S605 (that is, in a case where printing medium detection processing is not performed), or in a case of NO at S607 (that is, a printing medium is placed on the tray 403), the processing advances to S609. At S609, the job management application 311 determines the type of printing-target printing medium specified in the print job. In a case where results of determining the type of printing-target printing medium indicate that the type is an optical disc, the processing advances to S610, in a case where the results indicate that the type is a card, the processing advances to S615, and in a case where the results indicate that the type is other than these media, the series of processing shown in FIG. 6 is terminated.

In the following, a case is explained where the type of printing-target printing medium is determined to be an optical disc at S609. In this case, at S610, the printer control module 321 makes an attempt to detect the center portion of the optical disc 451. As the method of detecting the center portion, it may also be possible to derive (calculate) the diameter of the optical disc 451 and to take the center of the derived diameter as the center portion, or it may also be possible to derive the diameter of a hole 460 of the optical disc 451 and to take the center of the derived diameter as the center portion. For the derivation of the center portion, it may also be possible to use different amounts of reflected light for the black tray 403 and the white optical disc 451, or to use the placing position of the tray 403, which is derived at S602. It is possible to improve the detection accuracy of the center portion by two-dimensionally detecting the center portion both in the main scanning direction and in the sub scanning direction, in place of one-dimensionally detecting the center portion only in the main scanning direction.

At S611, the media position management application 312 determines whether the center portion of the optical disc 451 is detected as a result of the detection processing at S610. As a case where the detection of the center portion fails, for example, a case is considered where it is not possible to derive the diameter of the optical disc 451 because the optical disc 451 is not placed on the tray 403 or the optical disc 451 is not grasped correctly. Further, in a case where it is not possible to detect the edge (also referred to as boundary) of the optical disc as a result of that it is not possible to detect a change in the amount of reflected light because the already-printed optical disc 451, such as an optical disc whose entire surface is black, is used, it is also regarded that the detection of the center portion has failed. Further, it may also be possible to regard that the detection has failed in a case where the detection of the center portion of the optical disc 451 has succeeded, but the distance between the position of the detected center portion and the theoretical position of the center portion based on the positions of the first reflection plate 447A and the second reflection plate 447B obtained at S602 exceeds a predetermined threshold value. The reason is that there is a possibility that printing is performed on the tray 403 in a case where printing is performed on the printing medium in the state where the position of the center portion shifts largely from the ideal position. In a case where determination results at S611 are affirmative (that is, the detection of the center portion of the optical disc has succeeded), the media position management application 312 delivers the information indicating the position of the center portion to the job management application 311. The job management application 311 performs printing processing by the printer unit 212 by using the printer control module 321 after correcting the printing start position based on the information indicating the position of the center portion of the optical disc. On the other hand, in a case where determination results at S611 are negative, the processing advances to S612.

In a case of NO at S611 (that is, in a case where the detection of the center portion of the optical disc has failed), at S612, the job management application 311 determines whether not to perform printing medium detection processing. The processing at S612 is the same as the processing at S605. In a case where determination results at S612 are affirmative, the theoretical position of the center portion of the optical disc 451 is derived based on the positions of the first reflection plate 447A and the second reflection plate 447B obtained at S602. The information indicating the position of the center portion is delivered to the job management application 311 by the media position management application 312. The job management application 311 performs printing processing by the printer unit 212 by using the printer control module 321 after correcting the printing start position based on the information indicating the theoretical (ideal) position of the center portion. On the other hand, in a case where determination results at S612 are negative, the processing advances to S613.

At S613, the UI control module 323 controls the operation unit I/F 208 and notifies a user that the optical disc is not placed correctly on the tray 403 (optical disc placing position shift error) through the operation unit 213. Due to this, a user is prompt to check the placing position of the optical disc. As the method of giving a notification to a user, it may also be possible to transmit data to the host computer 214 via the USB I/F 209 or the network I/F 210 and to give a notification through the operation unit of the host computer 214.

Following the above, a case is explained where the type of printing-target printing medium is determined to be a card at S609. In this case, at S614, the printer control module 321 derives the position at which the card mount 456 is placed on the tray 403 by detecting the card mount 456 by using the optical sensor 125A. As the method of deriving the placing position of the card mount 456, a method is considered which derives the placing position based on the edge of the card mount 456 and the edge of the tray 403, which can be detected by using the optical sensor 125A. It may also be possible to derive an inclination of the card mount by detection at a plurality of portions and to correct a printing-target image in accordance with the inclination.

At S615, the job management application 311 determines whether not to perform printing medium detection processing. The processing at S615 is the same as the processing at S605. In a case where determination results at S615 are affirmative, the series of processing shown in FIG. 6 is terminated. On the other hand, in a case where determination results at S615 are negative, the processing advances to S616.

At S616, the media position management application 312 determines whether the card mount 456 is placed correctly at a predetermined position on the tray 403. It may be possible to perform this determination based on the edge of the card mount 456 and the edge of the tray 403, which are derived at S614. In a case where determination results at S616 are affirmative, the processing advances to S618 and on the other hand, in a case where the determination results are negative, the processing advances to S617.

In a case of NO at S616, at S617, the UI control module 323 controls the operation unit I/F 208 and notifies a user that the card mount is not placed correctly at a predetermined position on the tray 403 (card mount placing position shift error) through the operation unit 213. As the method of giving a notification to a user, it may also be possible to transmit data to the host computer 214 via the USB I/F 209 or the network I/F 210 and to give a notification through the operation unit of the host computer 214.

In a case of YES at S616, at S618, the printer control module 321 makes an attempt to detect the cards 459 set on the card mount 456 by using the optical sensor 125A. In detail, the printer control module 321 derives the positions of the detection holes 458A and 458B of the card mount 456 based on the installation position of the tray 403 derived at S602. Next, the printer control module 321 moves the tray 403 by driving the conveyance motor 120 so that the detection holes 458A and 458B and the optical sensor 125A are located at the same position in the sub scanning direction. Next, the printer control module 321 makes an attempt to detect the detection holes 458A and 458B of the card mount 456 by using the optical sensor 125A while moving the carriage 131. In a case where the cards 459 are not placed, as shown in FIG. 5C, the detection holes 458A and 458B are not covered, and as a result, the surface of the tray 403 is exposed. Because of this, it is possible to detect a change in the amount of reflected light resulting from white of the card mount 456 and black of the tray 403. On the other hand, in a case where the cards 459 are placed, as shown in FIG. 5D, the detection holes 458A and 458B are covered, and as a result, the white cards 459 are seen at all times, and therefore, the state is brought about where the amount of reflected light is large and constant. In order to improve the card detection accuracy, it may also be possible to two-dimensionally detect the detection hole by performing edge detection also in the sub scanning direction, in place of only the one-dimensional detection in the main scanning direction shown here.

At S619, the media position management application 312 determines whether the cards are detected as a result of the detection processing at S618. Specifically, for the card mount 456 capable of arranging the two cards 459, it may be possible to regard the detection as a failure in a case where neither of the cards 459 is installed, or it may also be possible to regard the detection as a failure in a case where the cards 459 are not installed at the printing-target positions specified in the print job. In a case where determination results at S619 are affirmative (that is, in a case where card detection has succeeded), correction of the print data in accordance with the placing position of the card mount 456 derived at S614 is performed. After this, the printing processing based on the corrected print data is performed. In contrast to this, in a case where determination results at S619 are negative (that is, in a case where card detection has failed), the processing advances to S620.

In a case of NO at S619, at S620, the UI control module 323 controls the operation unit I/F 208 and notifies a user that neither of the cards is installed on the card mount 456 (no card error) through the operation unit 213. As the method of giving a notification to a user, it may also be possible to transmit data to the host computer 214 via the USB I/F 209 or the network I/F 210 and to give a notification through the operation unit of the host computer 214. The above is the contents of the printing operation in the present embodiment.

<About Printing Sequence>

Figure 8B:
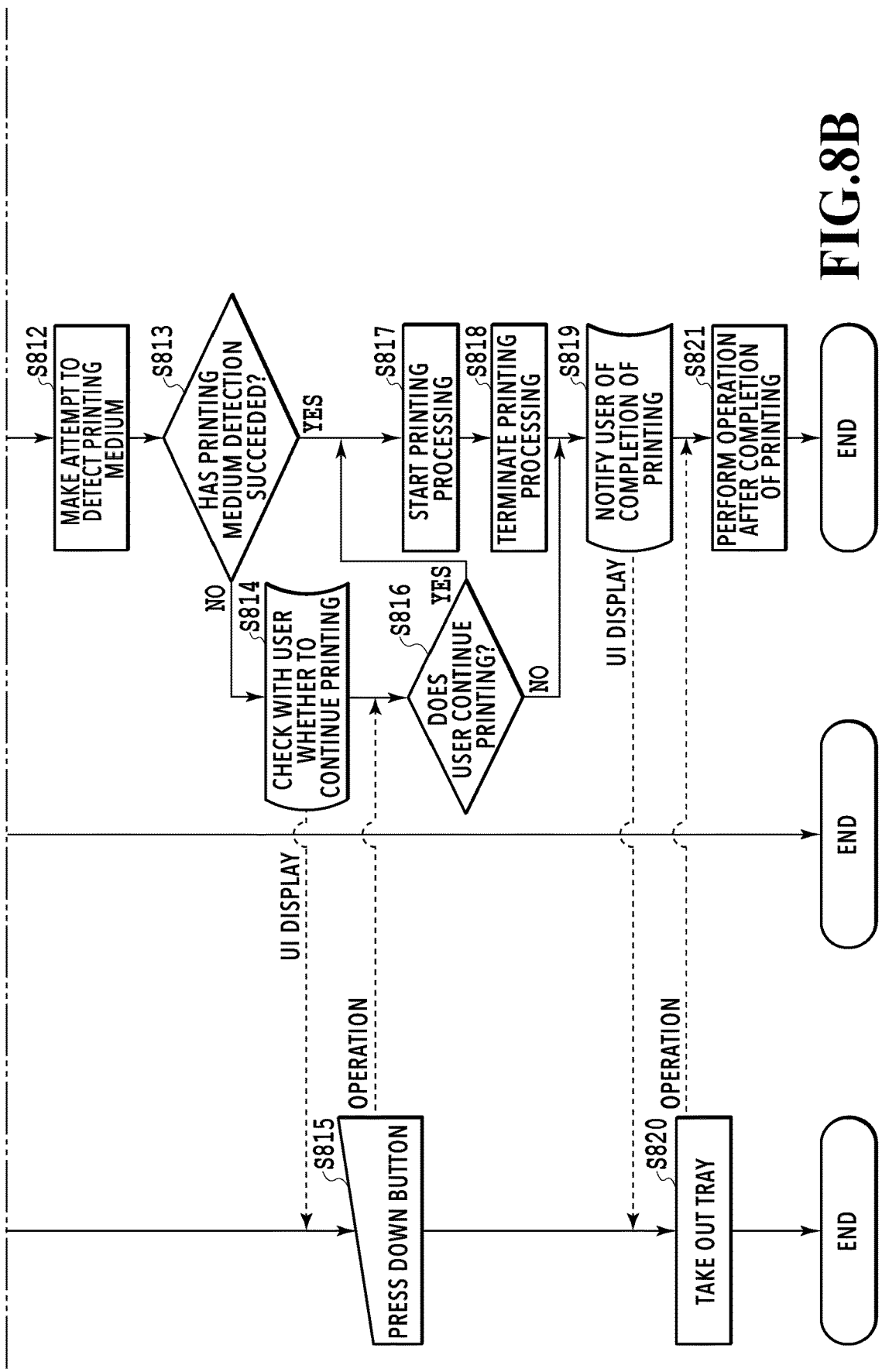
FIG. 8 is a diagram showing the relationship between FIG. 8A and FIG. 8B.
FIG. 8A and FIC. 8B are printing sequences in the first embodiment.

In the following, the printing sequence in the present embodiment is explained by using FIG. 8. FIG. 8 is a sequence diagram showing a flow of printing processing performed by the printer based on a print job generated in the host in accordance with the operation by a user.

At S801, a user who is operating the host computer 214, such as a personal computer and a tablet, creates a printing-target document by making use of an application, such as Word. As a result of the user operation at S801, the host computer 214 generates printing-target image data at S802. It may also be possible to set information on the type of printing medium on which printing is performed (specifically, the optical disc 451, the card 459, and the like), and the like at S801 and S802.

At S803, a user who is operating the host computer 214 instructs a specified printing apparatus to print the created document. By the user operation at S803, a print job including printing-target image data is generated in the host computer 214 at S804. At S805, the host computer 214 transmits the print job generated at S804 to the printing apparatus via the USB I/F 209 or the network I/F 210.

In the printing apparatus having received the print job at S806, printing preparation processing is performed at S807. The printing preparation processing includes processing to wipe off foreign matter or excessive ink attached to the nozzle surface by causing the maintenance mechanism 119 to operate and processing to remove foreign matter within the nozzle by ejecting ink onto the cap so that printing for the printing medium is performed normally. After the completion of the printing preparation processing, at S808, the UI control module 323 controls the operation unit I/F 208 and gives a notification to prompt a user to set the tray on which a printing medium is placed through the operation unit 213. As the method of giving a notification to a user, it may also be possible to transmit data to the host computer 214 via the USB I/F 209 or the network I/F 210 and to give a notification through the operation unit of the host computer 214.

At S809, the user given the notification at S808 mounts a printing medium on the tray 403 and sets the tray 403 on which the printing medium is placed to the printing apparatus main body. At S810, the user notifies the printing apparatus that the setting of the tray 403 on which the printing medium is placed to the printing apparatus main body is completed by operating the operation unit 213, specifically, by pressing down an "OK" button, and so on.

At S811, the UI control module 323 detects the user operation for the operation unit 213 via the operation unit I/F 208 and notifies the job management application 311 of the contents of the user operation. The job management application 311 having received the notification controls the printer unit 212 via the engine I/F 207 by using the printer control module 321. Specifically, the job management application 311 pulls the tray 403 into the printing apparatus by rotating the conveyance motor 120 in the reverse direction.

At S812, the printer control module 321 makes an attempt to detect the printing medium placed on the tray 403 by the method corresponding to the printing medium specified in the print job. As the method that is adopted at this step, it may also be possible to derive the method corresponding to the printing medium specified in the print job by, for example, having in advance a table specifying the detection method for each printing medium on the printing apparatus side and by referring to the table. Alternatively, it may also be possible to include the information such as this relating to the detection method in the print job.

At S813, the printer control module 321 determines whether the printing medium is detected at S812. For example, it may be possible to derive the position of the printing medium at S812 and to determine whether or not the printing medium is detected based on the amount of misalignment between the derived position and the theoretical position corresponding to the printing medium specified in the print job. In detail, it may be possible to determine that the detection of the printing medium has succeeded in a case where the amount of misalignment is less than or equal to a predetermined threshold value (or less than the predetermined threshold value). Alternatively, it may also be possible to regard the detection of the printing medium as having succeeded in a case where information to the effect that printing medium detection processing is not performed is set for the print job. In a case where determination results at S813 are affirmative, the processing advances to S817 and on the other hand, in a case where the determination results are negative, the processing advances to S814.

Figure 7:
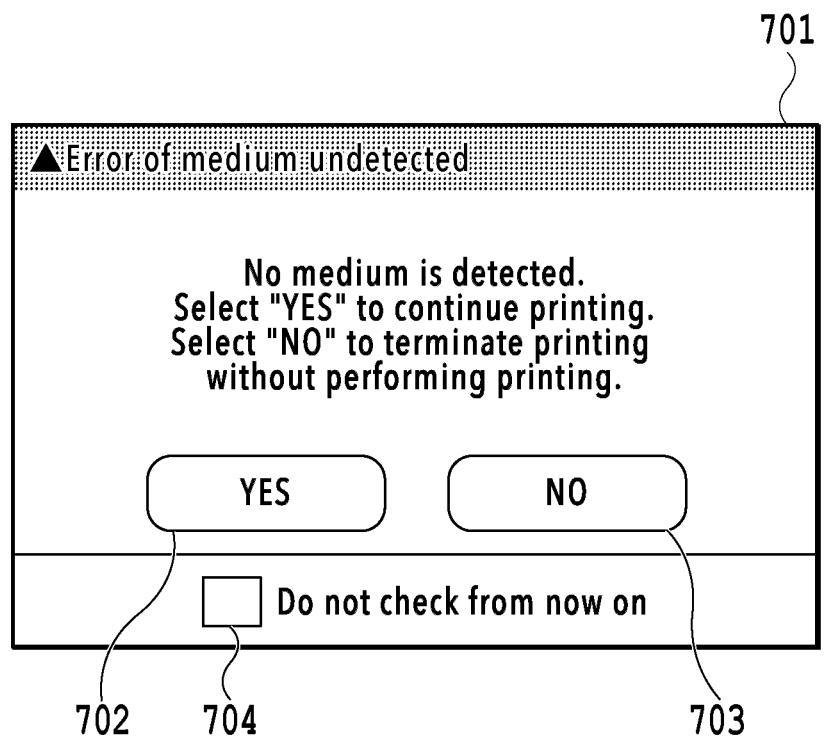
FIG. 7 is a screen giving a notification of a no printing medium error in the first embodiment.

In a case of NO at S813 (that is, in a case where the detection of the printing medium has failed), at S814, the job management application 311 checks with the user whether to continue printing by displaying a screen 701 as shown in FIG. 7 on the operation unit 213. The user having seen the screen 701 performs an operation on the screen 701 at S815. Specifically, in a case of continuing printing, the user presses down a "YES" button 702 and in a case of suspending printing, the user presses down a "NO" button 703. Further, it may also be possible for the screen 701 to have an item (specifically, a checkbox 704) that enables a user to select not to check from now on. It may also be possible to set information indicating whether or not printing medium detection processing is performed to default ineffective (indicating that detection processing is not performed) in a case where the user checks the checkbox 704 and then presses down the "YES" button 702. Here, the aspect is shown in which a user operates the operation unit 213 of the printing apparatus 100, but it may also be possible for a user to give a notification to the printing apparatus 100 via the USB I/F 209 or the network I/F 210 by operating the operation unit of the host computer 214. Due to this, it is possible for a user to continue desired printing processing even in a case where it is not possible to perform appropriate detection by the optical sensor 125A because the difference in color between the color of the optical disc or the card and the color of the tray is small.

At S816, the job management application 311 determines whether to continue printing in accordance with the user operation at S815. In a case where determination results at S816 are affirmative, the processing advances to S817. On the other hand, in a case where determination results at S816 are negative, the processing at S817 and S818, to be described later, is skipped and the processing advances to S819.

At S817, the media position management application 312 delivers information indicating the position of the printing medium to the job management application 311. The job management application 311 corrects the printing start position based on the information. Then, the job management application 311 causes the printer unit 312 to start printing processing in accordance with the print data by using the printer control module 321. After this, at S818, the job management application 311 causes the printer unit 312 to terminate the printing processing in accordance with the print data by using the printer control module 321. The tray 403 moves up to a predetermined position by the printer control module 321 rotating the conveyance motor 120 in the forward direction at arbitrary timing after S818.

At S819, the UI control module 323 controls the operation unit I/F 208 and notifies a user that the printing is completed through the operation unit 213. As the method of giving a notification to a user, it may also be possible to transmit data to the host computer 214 via the USB I/F 209 or the network I/F 210 and to give a notification through the operation unit of the host computer 214.

At S820, the user given the notification at S819 takes out the tray 403 on which the printing medium for which printing is completed is placed from within the printing apparatus.

At S821, the printing apparatus performs operations after completion of printing, such as cap closing. The above is the contents of the printing sequence in the present embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to prevent printing processing from being performed in a case where a printing medium is not placed correctly on a tray because of an erroneous operation of a user, or the like. Consequently, it is made possible to prevent the inside of a printing apparatus and the tray from being stained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-144920, filed Aug. 1, 2018, which is hereby incorporated by reference herein in its entirety.

What is claimed is:
1. A printing apparatus comprising:
 a conveyance unit configured to convey a tray on which a printing medium is placed;
 a printing unit configured to perform printing on a print surface of a printing medium on the tray based on a print job;
 a first detection unit configured to detect a relative position relationship between the tray and a printing medium placed on the tray;

a control unit configured to control the printing unit not to perform printing in a case where the first detection unit detects that the printing medium is not placed at an appropriate position; and a selecting unit configured to select whether to continue printing irrespective of results of the detection by the first detection unit.

2. The printing apparatus according to claim 1, further comprising:

a second notification unit configured to give a notification of an error indicating that the printing medium is not placed on the tray in a case where the first detection unit detects that the printing medium is not placed on the tray.

3. The printing apparatus according to claim 1, wherein the first detection unit includes a reflection plate provided on the tray and an optical sensor and the reflection plate is provided at a position that is covered in a case where the printing medium is placed.

4. The printing apparatus according to claim 1, wherein the first detection unit includes a concave portion on the tray and a distance sensor, and the concave portion is provided at a position that is covered in a case where the printing medium is placed.

5. The printing apparatus according to claim 1, further comprising:

a first calculation unit configured to calculate a position of the tray with respect to the printing apparatus;

a second calculation unit configured to calculate a theoretical placing position of the printing medium with respect to the tray based on the position of the tray;

a third calculation unit configured to calculate an actual placing position of the printing medium on the tray; and a fourth calculation unit configured to calculate an amount of misalignment between the theoretical placing position and the actual placing position, wherein in a case where the amount of misalignment is larger than a predetermined threshold value, the first notification unit gives a notification of an error, and in a case where the amount of misalignment is smaller than the predetermined threshold value, a printing start position is corrected in accordance with the actual placing position.

6. The printing apparatus according to claim 5, wherein in a case where the amount of misalignment is larger than a predetermined threshold value, a printing start position is corrected in accordance with the theoretical placing position, not in accordance with the actual placing position.

7. The printing apparatus according to claim 1, wherein printing medium includes an optical disc, a nail seal group arranged on a nail seal mount placed on the tray, and a card that is set into a concave shape possessed by a mount placed on the tray, and the printing apparatus further comprises a first determination unit configured to determine the type of the printing medium based on the print job.

8. The printing apparatus according to claim 7, further comprising:

a determination unit configured to determine whether or not the mount is placed at a predetermined position on the tray in a case where the first determination unit determines that the type of printing medium is a card.

9. The printing apparatus according to claim 1, further comprising:

a carriage that mounts the printing unit and moves along a scanning direction; and a sensor mounted on the carriage and capable of detecting an edge of the tray and an edge of a printing medium placed on the tray.

10. The printing apparatus according to claim 1, further comprising:

a second detection unit configured to detect the tray; and a third notification unit configured to give a notification of an error indicating that the tray is not set in a case where the second detection unit does not detect the tray.

11. The printing apparatus according to claim 1, wherein the control unit controls the printing unit not to perform printing in a case where the first detection unit detects that the printing medium is not placed on the tray.

12. The printing apparatus according to claim 1, wherein the control unit includes a first notification unit configured to give a notification of an error.

13. The printing apparatus according to claim 12, wherein the first notification unit includes a display unit for checking with a user whether or not to continue printing based on the print job in a case where the first detection unit does not detect the printing medium.

14. The printing apparatus according to claim 12, further comprising a display unit configured to display the notification.

15. A control method of a printing apparatus comprising a conveyance unit configured to convey a tray on which a printing medium is placed and a printing unit configured to perform printing on a print surface of a printing medium on the tray based on a print job, the method comprising:

detecting a relative position between the tray and a printing medium placed on the tray;

controlling the printing unit not to perform printing in a case where it is detected that the printing medium is not placed at an appropriate position; and selecting whether to continue printing irrespective of results of the detection.

16. A non-transitory computer readable storage medium storing a program for causing a computer to perform a control method of a printing apparatus comprising a conveyance unit configured to convey a tray on which a printing medium is placed and a printing unit configured to perform printing on a print surface of a printing medium on the tray based on a print job, the method comprising:

detecting a relative position between the tray and a printing medium placed on the tray;

controlling the printing unit not to perform printing in a case where it is detected that the printing medium is not placed at an appropriate position; and selecting whether to continue printing irrespective of results of the detection.

* * * * *